UNITED STATES PATENT OFFICE.

KARL KULAS, OF LEIPZIG, AND CURT PAULING, OF LEIPZIG-LINDENAU, GERMANY.

PROCESS OF MANUFACTURE OF PRODUCTS OF CONDENSATION FROM PHENOL.

1,414,139.            Specification of Letters Patent.    Patented Apr. 25, 1922.

No Drawing.      Application filed December 20, 1920. Serial No. 432,150.

*To all whom it may concern:*

Be it known that we, KARL KULAS and CURT PAULING, citizens of the German Republic, and residing at Leipzig and Leipzig-Lindenau, Germany, respectively, have invented certain new and useful Improvements in a Process for the Manufacture of Products of Condensation from Phenol, of which the following is a specification.

It is well known that phenol or its homologues and formaldehyde or its polymers are capable of reacting to yield a condensation product of a resinous character, the properties of which depend upon the duration of the heating, the nature of the condensation agent, the quantities of the different chemicals employed and other conditions. As condensation agents both acids and bases are used, as well as salts, natural resins, soaps and so forth. When using acids as condensation agents, fusible resins are produced, as a rule, which may be heated to any temperature without being converted into insoluble and infusible products, whereas the application of bases or materials acting as a base yields resins which on further heating are quickly transformed into insoluble and infusible products.

We have found that by carrying out the process in two phases or stages, we attain results that could not be foreseen. In the first stage we effect the condensation by means of an acid and after the resin has been formed we apply in the second stage a base as condensation agent in a quantity, that far surpasses the amount needed for neutralizing the acid used in the first stage and must even considerably exceed 10% of the quantity of the active phenolic body. We found that the consumption of formaldehyde is essentially less than in all the processes hitherto known, whereas the yield of the resinous body is considerably higher. 100 parts of phenol and cresol and 50 parts 40% formaldehyde yield 80 parts of the artificial resin. The losses always occurring when using acids as condensation agents are reduced to a minimum by the alkaline condensation in the second phase. The resins produced in the acid medium act moderatingly on the reaction, the frothing of the mass is much less and the formation of the resin is greatly accelerated, so that there is a great saving in the raw material, fuel, time, power, wages and so forth.

By decreasing or increasing the total quantity of formaldehyde fusible or infusible resins are produced at will and the nature of the resin can therefore be suited to its temporary application.

The solubility of the resins thus made is very manifold. The resins dissolve not only in the usual solvents for artificial resins, but they also dissolve both in cold and warm alcohol without residue, in mixtures of benzol and solvent naphtha, benzol and acetone, technical benzol and denatured 95% alcohol.

If in the preparation of fusible resins an addition of 2 to 3% of a hydrosulphite or a sulphite be made and at the same time about 12% of soap, the resin produced is completely soluble in benzol, artificial turpentine or in a mixture of benzene and fat oils.

Those properties of dissolving accompanied by quick drying and hardening of the varnishes thus prepared make those resins an excellent substitute for copal and dammar resins and shellac.

Hitherto it has been found necessary to add some natural resins, like colophonium, copal, dammar, fat oils and so on to the artificial resins, when required to dissolve the latter in benzol, oil of turpentine and the like. Such an addition is no longer necessary and can be dispensed with.

As a matter of course, not only phenols, like cresol or carbolic acid can be used in the preparation of the artificial resins, but the common formaldehyde can be replaced by trioxymethylene or hexamethylenetetramin.

Example I.

50 parts by weight of cresol or phenolic acid, 25 parts by weight of 40% formaldehyde, 1.5 parts by weight of acid (hydrochloric acid of 1.5 spec. grav.) are boiled together for about 10 to 15 minutes, until the formation of resin has taken place. The mass is then allowed to cool somewhat and 120 parts by weight of cresol or phenolic acid, 60 parts by weight of 40% formaldehyde, 10 parts by weight of $NH_3$, 2.5 parts by weight of solid sodium hydrate to be applied in the form of a solution of about 1.4 spec. grav., 2.5 parts by weight of solid potassium hydrate to be applied in the form of a solution of about 1.4 spec. grav. are added and the whole mass is cooled about 30 minutes in a container with a reflux cooler. The resin is then separated from the water present by decantation or the heating is continued until all the water is evaporated and a sample drawn will form on cooling a solid and brittle mass which becomes plastic on being warmed.

The product is fusible and dissolves in cold and warm alcohol, ethyl acetate, acetone, crude solvent naphtha, as well as in mixtures of benzol and acetone, technical benzol and solvent naphtha, or benzol and 95% denatured spirit. It is insoluble in nitric-sulphuric-or hydrochloric acid, sodium hydrate, but soluble in potassium hydrate.

*Example II.*

50 parts by weight of cresol or phenolic acid, 25 parts by weight of 40% formaldehyde, 1.5 parts by weight of acid (techn. 50% acetic acid) are boiled together for about 10 to 15 minutes. To the mass are then added: 120 parts by weight of cresol or phenolic acid, 60 parts by weight of 40% formaldehyde, 15 parts by weight of anhydrous soap in the form of a very strongly alkaline soap solution, 5 parts by weight of a hydrosulphite or a neutral sulphite. The latter being a compound in which all the replaceable hydrogen is replaced by the radical of the sulphurous acid. The boiling is then continued in a container with a reflux condenser until a liquid, slimy resinous mass is produced. The water is decanted or the mass concentrated until on cooling a solid, plastic mass is formed. The resin thus obtained is fusible and dissolves in warm or cold alcohol, benzol, acetone, fat oils, solvent naphtha, and in mixtures of those solvents. It is insoluble in nitric-sulphuric and hydrochloric acid and sodium hydrate, but soluble in potassium hydrate.

*Example III.*

50 parts by weight of cresol or phenolic acid, 25 parts by weight of 40% formaldehyde, 1.5 parts by weight of acid (hydrochloric acid of 1.15 spec. grav.) are boiled together for about 10 to 15 minutes. To the mass are then added: 120 parts by weight of cresol or phenolic acid, 90 parts by weight of 40% formaldehyde, 10 parts by weight of $NH_3$, 2.5 parts by weight of solid sodium hydrate to be applied in the form of a solution of about 1.4 spec. grav., 2.5 parts by weight of solid potassium hydrate to be applied in the form of a solution of about 1.4 spec. grav. The boiling is continued in a container with a reflux condenser for about 30 minutes. The resin produced is freed from the water in excess or concentrated until a sample drawn forms on cooling a solid, plastic mass.

The product obtained dissolves in cold or warm alcohol, acetone, ethyl acetate and crude solvent naphtha and in mixtures of those solvents. It is insoluble in sodium hydrate and mineral acids.

When heating that mass for 6 to 8 hours or even longer it is transformed into an insoluble and infusible product of high insulating properties and is therefore especially suitable for the preparation of electric articles.

What we claim is:

1. The herein described process of manufacturing resinous condensation products from phenolic bodies and formaldehyde, consisting in heating phenol and formaldehyde with an acid condensing agent until a resin is formed and permitting the mass to stand until stratified, adding phenol and formaldehyde to the hot mass together with an alkaline condensing agent in such quantity that after neutralizing the acid there is an excess of the alkaline agent of more than 10% of the active phenol used, and heating the mass until the final formation of resin has taken place, substantially as described.

2. The herein described process of manufacturing resinous condensation products from phenolic bodies and formaldehyde, consisting in heating phenol and formaldehyde with an acid condensing agent until a resin is formed and permitting the mass to stand until stratified, adding phenol and formaldehyde to the hot mass together with soap as an alkaline condensing agent in such quantity that after neutralizing the acid there is an excess of the alkaline agent of more than 10% of the active phenol used, and heating the mass until the final formation of resin has taken place, substantially as described.

3. The herein described process of manufacturing resinous condensation products from phenolic bodies and formaldehyde, consisting in heating phenol and formaldehyde with an acid condensing agent until a resin is formed and permitting the mass to stand until stratified, adding phenol and formaldehyde to the hot mass together with soap and a hydrosulphite, the soap being in such quantity that after neutralizing the acid there is an excess of the alkaline agent of more than 10% of the active phenol used, and heating the mass until the final formation of resin has taken place, substantially as described.

4. The herein described process of manufacturing resinous condensation products from phenolic bodies and formaldehyde, consisting in heating phenol and formaldehyde with an acid condensing agent until a resin is formed and permitting the mass to stand until stratified, adding phenol and formaldehyde to the hot mass together with soap and a sulphite, the soap being in such quantity that after neutralizing the acid there is an excess of the alkaline agent of more than 10% of the active phenol used, and heating the mass until the final formation of resin has taken place, substantially as described.

5. The herein described process of manufacturing resinous condensation products from phenolic bodies and formaldehyde, consisting in heating phenol and formaldehyde with an acid condensing agent until a resin is formed and permitting the mass to stand until stratified, adding phenol and formaldehyde to the hot mass, the quantity of formaldehyde added being considerably higher than when permanently soluble resins are to be produced, together with an alkaline condensing agent in such quantity that after neutralizing the acid there is an excess of the alkaline agent of more than 10% of the active phenol used, and heating the mass until the final formation of resin has taken place, substantially as described.

In testimony whereof we have affixed our signatures.

KARL KULAS.
CURT PAULING.